US011912055B2

(12) United States Patent
Lin et al.

(10) Patent No.: US 11,912,055 B2
(45) Date of Patent: Feb. 27, 2024

(54) METHOD AND SYSTEM FOR PRINTING VARIABLE IMAGES

(71) Applicant: Xerox Corporation, Norwalk, CT (US)

(72) Inventors: Guo-Yau Lin, The Woodlands, TX (US); Eliud Robles Flores, Rochester, NY (US); Varun Sambhy, Pittsford, NY (US); David R. Stookey, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 164 days.

(21) Appl. No.: 17/658,052

(22) Filed: Apr. 5, 2022

(65) Prior Publication Data

US 2023/0311555 A1 Oct. 5, 2023

(51) Int. Cl.

*B41M 5/50* (2006.01)
*B41M 5/00* (2006.01)
*G03G 15/10* (2006.01)

(52) U.S. Cl.

CPC ............ *B41M 5/50* (2013.01); *B41M 5/0023* (2013.01); *G03G 15/10* (2013.01)

(58) Field of Classification Search

CPC .... B41M 5/50; B41M 5/0023; B41M 5/0041; B41M 5/502; G03G 15/10
See application file for complete search history.

(56) References Cited

U.S. PATENT DOCUMENTS

| | | | | |
|---|---|---|---|---|
| 5,935,755 | A | 8/1999 | Kazmaier et al. | |
| 6,419,618 | B1 | 7/2002 | Mackinlay et al. | |
| 7,130,108 | B2 | 10/2006 | Yang et al. | |
| 7,352,501 | B2 * | 4/2008 | Chopra ................ | G02B 26/026 359/292 |
| 7,426,798 | B2 | 9/2008 | Koomen et al. | |
| 8,132,504 | B2 * | 3/2012 | Thompson ............ | B41F 19/062 101/23 |
| 9,196,179 | B2 | 11/2015 | Stuart et al. | |
| 9,892,585 | B2 | 2/2018 | Eschbach et al. | |
| 2008/0297878 | A1 | 12/2008 | Brown et al. | |

OTHER PUBLICATIONS

Electronic Ink, https://eink.com/electronic-ink.html, Feb. 23, 2022.

* cited by examiner

*Primary Examiner* — Henok D Legesse
(74) *Attorney, Agent, or Firm* — Fox Rothschild LLP

(57) ABSTRACT

A printed structure, and systems and methods for creating the printed structure are disclosed. The printed structure includes a substrate, a first printed image layer, and a second printed image layer printed at least partially over the first printed image layer. The first printed image layer includes a first variable image printed using a first electrophoretic ink and the second printed image layer includes a second variable image printed using a second electrophoretic ink. The first variable image and the second variable image are configured to selectively change their display states upon application of an electric field.

20 Claims, 7 Drawing Sheets
(4 of 7 Drawing Sheet(s) Filed in Color)

METHOD AND SYSTEM FOR PRINTING VARIABLE IMAGES

BACKGROUND

Cellulose (in the form of printed paper) is the prime medium for displaying information. This is because of its high reflectivity, contrast, low cost, biodegradability, and flexibility. However, information printed on cellulose paper is typically static and unchangeable.

Changeable or variable display devices are typically electronic devices that are constructed on various polymer substrates (e.g., plastic or glass) to create electrophoretic displays (e.g., e-paper or e-display). Such electrophoretic displays generally include electrically sensitive pigment particles dispersed in a carrier or suspension fluid ("electrophoretic capsules"), and arranged between two parallel conducting electrode panels. Such electrophoretic displays are based on "electrophoresis"—i.e., the movement or rotation of electrically charged molecules in an electric field. In electrophoretic displays, there are tiny microcapsules containing charged black and charged white pigments, having opposite charges, that are suspended in a clear fluid. This "electrophoretic ink" is positioned on a polymer (non-cellulose) substrate and laminated on to a layer of circuitry that forms a pattern of pixels controllable by application of an electric field. For example, when a negative electric field is applied to the electrophoretic ink, the white particles move to the top of the capsule making the surface appear white at that specific spot, and when a positive field is applied, the black particles appear at the top making the surface of the capsule appear dark. Combination of different color pigments and electric charges may be used to create color electrophoretic displays.

While such electrophoretic displays are used for displaying variable or changeable information, they usually suffer from costly and complex fabrication procedures, degradation of image quality over time, and use of nonbiodegradable polymer substrates. In addition, electrophoretic displays and many electrophoretic inks require not only a substrate, but also a cover such as a clear glass or plastic layer over the ink to hold the ink in place.

This document describes methods and systems that are directed to solving the issues described above.

SUMMARY

In various aspects, this disclosure describes a printed structure, methods for creating the printed structure, systems configured to execute the method, and a computer program product configured to cause a processor to implement the method.

In various scenarios, the printed structure may include a substrate, a first printed image layer, and a second printed image layer printed at least partially over the first printed image layer. The first printed image layer may include a first variable image printed using a first electrophoretic ink and that is configured to change from a first display state to a second display state upon application of an electric field via a first electroconductive path. The second printed image layer may include a second variable image printed using a second electrophoretic ink that is configured to change from a third display state to a fourth display state upon application of the electric field via a second electroconductive path.

In various embodiments, the substrate may be a flexible material that includes at least one of the following: paper, acrylic, polyester, vinyl, or cloth.

In various example embodiments, the first electrophoretic ink and the second electrophoretic ink may include a plurality of microcapsules, each of the plurality of microcapsules including a plurality of electrophoretic particles that will change an optical property of that electrophoretic ink upon application of the electric field to cause the first variable image to change from the first display state to the second display state or cause the second variable image to change from the third display state to the fourth display state. Optionally, at least some of the plurality of electrophoretic particles may include a first side that includes black pigment and a first charge and a second side that includes white pigment and a second charge. Additionally and/or alternatively, at least some of the plurality of electrophoretic particles may include a first side that includes a first color pigment and a first charge, and a second side that includes a second color pigment and a second charge.

Optionally, a protective layer may be formed over at least one of the first printed image layer or the second printed image layer.

In some embodiments, the first variable image may be invisible in the first display state and the second variable image may exhibit a second color in the fourth display state such that application of the electric field via the second electroconductive path without application of the electric field via the first electroconductive path causes the printed substrate to display the second variable image in the second color.

In some other embodiments, the first variable image may exhibit a first color in the second display state and the second variable image may be invisible in the third display state such that application of the electric field via the first electroconductive path without application of the electric field via the second electroconductive path causes the printed substrate to display the first variable image in the first color.

Optionally, the printed structure may also include a static image that does not change display state.

Optionally, each of the first electroconductive path and the second electroconductive path may include a pair of transparent electrodes.

Additionally, the first printed image layer may be sandwiched between another pair of transparent electrodes.

In any of the embodiments above, a method for creating a printed structure comprising selectively controllable variable images may include printing, by a print device, a first image layer on a substrate, printing at least partially over the first printed image layer, providing a first electroconductive path to the first variable image, and providing a second electroconductive path to the second printed image layer. The first printed image layer may include a first variable image printed using a first electrophoretic ink that is configured to change from a first display state to a second display state upon application of an electric field via the first electroconductive path. The second printed image layer may include a second variable image printed using a second electrophoretic ink that is configured to change from a third display state to a fourth display state upon application of the electric field via the second electroconductive path.

Optionally, the printing of the first image layer and the second image layer comprises inkjet printing or xerographic printing.

In various embodiments, the methods may also include applying a protective layer over at least one of the first image layer or the second image layer.

In one or more embodiments, providing the first electroconductive path may include printing, by the print device, a pair of electrodes that sandwich the first image layer. Additionally and/or alternatively, providing the second electroconductive path comprises printing, by the print device, a pair of electrodes that sandwich the second image layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
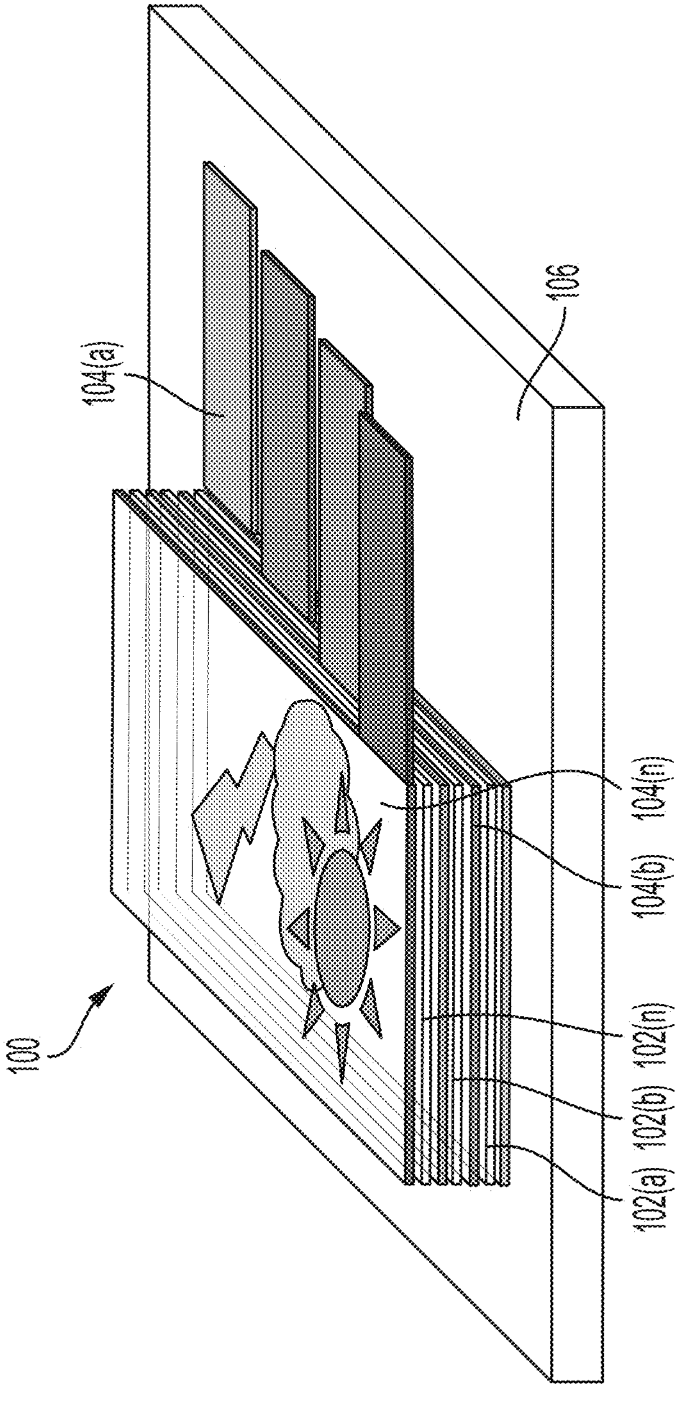
FIG. 1 illustrates a schematic view of a printed structure on which variable images are printed.

As used in this document, the singular forms “a,” “an,” and “the” include plural references unless the context clearly dictates otherwise. Unless defined otherwise, all technical and scientific terms used herein have the same meanings as commonly understood by one of ordinary skill in the art. As used in this document, the term “comprising” (or “comprises”) means “including (or includes), but not limited to.” When used in this document, the term “exemplary” is intended to mean “by way of example” and is not intended to indicate that a particular exemplary item is preferred or required.

In this document, when terms such “first” and “second” are used to modify a noun, such use is simply intended to distinguish one item from another and is not intended to require a sequential order unless specifically stated. The term “approximately,” when used in connection with a numeric value, is intended to include values that are close to, but not exactly, the number. For example, in some embodiments, the term “approximately” may include values that are within +/−10 percent of the value.

Additional terms that are relevant to this disclosure will be defined at the end of this Detailed Description section.

As used herein, a “variable image” or a “changeable image” refers to information (e.g., text, graphics, etc.) printed on a substrate that can change from a first display state (or optical state) to a second display state, differing in at least one property, upon application of external stimulus such as an electric field or a magnetic field. Examples of the property may include optical characteristics such as, without limitation, made invisible, made visible, change color, change luminescence, change intensity, or the like. A “static image” refers to information that cannot change from one display state to another.

As discussed above, while the use of electrophoretic displays to generate variable images is known, it has certain disadvantages. This disclosure describes printing of variable images on a flexible medium or substrate such as a paper substrate (also, referred to as paper). Compared to electrophoretic displays, paper, comprising entangled micro- or nano-scale cellulose fibers, is compatible with scalable fabrication techniques and can provide a sustainable, inexpensive, disposable, and biocompatible substrate for the purposes of printing information in a variable manner. Furthermore, printable media, such as, for example, sheets of paper, exhibit a higher readability and resolution than the readability of display screens associated with electrophoretic displays.

The disclosure further describes printing of selectively controllable image layers sandwiched between electrodes to allow for selective display of information.

As used herein, a “substrate” refers to any printable medium including, for example, paper, plastic sheets (e.g., acrylic, vinyl, and polyester), cloth, or the like. In various embodiments, the substrate may be flexible. “Paper” or “paper substrate” refers to a material manufactured using pulp derived from wood, rags, straw, or other fibrous substances (with or without other additive materials). Examples of paper may include, without limitation, single sheets of paper of various thicknesses, packaging material(s), paperboard (or other heavy duty paper products), recycled paper, cardstock, or the like.

Printed variable images of the current disclosure may have many applications where a partially or fully changing image printed on a substrate (e.g., a flexible substrate such as paper) is desired, such as, but not limited to, security documents, currency, packaging boxes, greeting cards, business cards, entertainment attractions, and so on. For example, the techniques described herein can be used to add specific parts to an image under particular electric field applications; create variable images for entertainment purposes; aid color-blind people in providing an enhanced adapted second version of an image when electric field is applied, while preserving the appearance under other electric field conditions; add color to a black and white image; hide image in randomized colors, which are only revealed upon application of the appropriate electric field; or the like.

For example, variable images of the current disclosure may be useful in security applications. Security is an important requirement in many document printing applications. In situations such as official or government document printing, event ticket printing, financial instrument printing and the like, many printed materials must be protected against copying, forging and/or counterfeiting. In such situations, document creators may wish to encode a security mark in a document in a way that is invisible to the human eye, but which becomes visible when certain external stimulus is applied to the document. For example, financial instruments such as checks, event admission tickets and other documents for which it is important to visually distinguish the original from a copy may include such security marks. The methods and systems of this disclosure may be used to print security marks (in the form of variable images) on documents for security and/or authentication such that the security marks only become visible upon application of an electric field (as discussed below). Such a feature may be useful, for example, in authentication of documents, as a forged document or photocopy would not have the ability to change appearance upon exposure to the activating electric field. Specifically, when a document including the variable images printed with an ink having the electrophoretic particles and/or electrodes of the current discloser is photocopied, the copied image will not have the variable characteristics because the copying ink will not include electrophoretic particles, and the copied document will not include the electrodes for application of electric field. Such a feature is advantageous in that authentication is possible because falsified copies cannot be made to include the variable image property. Also, this feature can permit one to intentionally embed hidden information in documents, which information is only revealed to one knowing to expose the document to the appropriate electric field. The change in the printed image can be repeated an indefinite number of times.

According to the disclosure, a printed substrate is provided that includes at least one printed variable image that is printed, at least partially, using a material that is optically changeable by an electric or magnetic field. By using a material whose optical properties are modifiable by an electric or magnetic field, the variable image can be switched from one display or optical state to another.

For example, the optically changeable material includes an electrophoretic ink having a plurality of particles (e.g., electrophoretic particles) that are changeable in their position and/or alignment by an electric or magnetic field. This can be obtained, for example, by suspending the particles in a suspension fluid in the form of microcapsules so that the particles can move freely within the microcapsules. Electrophoretic ink, as used herein, refers to an ink (e.g., toner or colored ink) that has the capability of to change state (e.g., change color, become visible, etc.) upon exposure to an activating electric field (or, other stimulus such as a magnetic field).

Examples of such particles include those known as Gyricon® balls, which were developed by Xerox and its Palo Alto Research Center. These particles include of at least two halves that are colored with different pigments and simultaneously have different electric properties. The particles can be, for example, white and negatively charged on one side, and black and positively charged on the other side. However, any other combination of electric polarity and color is also possible. All elements working on the rotating ball principle can fundamentally also be aligned in a magnetic field if the particles have a magnetic polarity. When the particles are suspended to be freely movable within the microcapsules, and are exposed to an electric or magnetic field, the particles will align with the field lines. The particles thus rotate and turn one of their sides to the viewer, with a suitable field direction of the particles, so that the viewer sees, for example, either only the black side or only the white side in the case of a black-and-white colored particle with suitable polarity, and the surface of the material thus appears white or black. Similarly, a plurality of colored particles can be embedded in individual microcapsules, whereby two different kinds of particles having different colors and different electric charges are used. An applied electric field then ensures that one kind of particle moves in the field direction and the other kind contrary to the field direction. If several such microcapsules are located side by side in a layer of material, the color of the layer of material can consequently be altered—regarded from a certain viewing direction—by accordingly applying a field. Any combination of particle color and electric polarity can be used here depending on the case of application. The stated optically changeable materials are bistable such that the particles remain in their position and/or alignment until a new field is applied that aligns them differently or changes their position.

Other particles that may be used in the concepts described in this document include those in electronic inks offered by, for example, E-Ink Corporation. In such inks, the microcapsules contain particles of multiple pigments and different charges. For example, the microcapsules may include first pigment particles of a first color that exhibit a first charge (example: they may be positively charged), along with second pigment particles of a second color that exhibit a second charge (example: they may be negatively charged). Particles of additional colors and charges may be included as well. When an external charge is applied to the microcapsules, the pigment particles will be either attracted to or repelled by the eternal charge, and thus will arrange themselves so that one side of the microcapsule exhibits the first color while the other side of the microcapsule exhibits the second color. Such particle may, optionally, be suspended in clear fluid such that before application of any electric field, they appear to be invisible.

In various embodiments, the above particles can be used as pigments of a "printing ink," i.e. an optically changeable material is produced that can be processed like a printing ink (e.g., as an electrophoretic ink). The optically changeable material can be applied precisely like any other printing ink by inkjet printing, xerographic printing, or any now or hereafter known methods.

FIG. 1 illustrates a schematic view of a printed structure 100 on which variable images are printed. As shown in FIG. 1, the printed structure 100 includes a base material 106 or substrate and one or more image layers 102(*a*)-(*n*), each of which is sandwiched between at least one pair of electrodes (e.g., electrodes 104(*a*)-(*n*)). The substrate 106 may be a flexible substrate such as paper (e.g., cellulose paper), or any other suitable materials such as plastic (e.g., acrylic, vinyl, polyester, etc.), cloth, or the like. Optionally, the substrate 106 may be coated with, for example, protective coatings, binders for electrophoretic ink particles, adhesives, or the like. Any number of image layers are within the scope of this disclosure.

Each of the image layers may be printed using electrophoretic ink and particles (discussed above) and may include one or more variable images and/or one or more static images. It should be noted that variable images can include, without limitation, graphics, text, or any other type of printed information. In certain embodiments, variable images may be printed using one or more types of electrophoretic ink. In addition, when this document uses the term "image layer" it does not necessarily mean that the entire substrate must be covered with an image, or that a complete image must be printed in a single layer. Optionally, a first image layer may only contain certain elements of an image, such as those corresponding to a single color, while other image layers may contain elements of the image, such as those that correspond to other colors.

In various embodiments, the variable images of one image layer may differ from the variable images of one or more other image layers such that multiple image layers having different variable images may be printed on top of each other. As discussed below, such layering of image layers allows for selective switching ON or OFF of display of variable images in each image layer by application or removal of an appropriate electric field to that image layer, via the corresponding electrode(s). The differences in the variable images may include, for example, color differences (created by printing the variable images using electrophoretic ink with different combinations of electrophoretic particle colors), differences in content, differences in positioning with respect to the substrate, differences in image contrast or intensity, or the like. As such, selective switching ON or OFF of display of variable images in each image layer by application or removal of an appropriate electric field to that image layer can create an overall display effect such as, without limitation, making images invisible (when electric field is removed and/or an electric field is applied that causes the image to acquire a color that is the same as that of the substrate—e.g., white), making images visible (when electric field is applied), making images change color (when electric field is applied to an image layer having variable images of a color that is different from that of variable images of an image layer that is being displayed, and making the image layer being displayed invisible by removing or changing the electric field input), making images move from one position to another on the substrate (when electric field is applied to an image layer having variable images of a position that is different from that of variable images of an image layer that is being displayed, and invisible by removing or changing the electric field input), or combinations thereof.

It should be noted that such display effects may also be created on a single image layer by selective control of application of electric field (via appropriately positioned electrodes) to variable images of such an image layer. Alternatively and/or additionally, the display effects created within a single image layer may be combined with display effects created using multiple image layers. In some other embodiments, two image layers may be simultaneously activated to create an overlapping display effect (e.g., a holographic effect).

Optionally, if the electrophoretic particles are bistable (as discussed above), the variable images are also bistable such that they maintain the display state acquired after application of an electric field even when the electric field is removed, until a new electric field is applied.

The electrodes 104(*a*)-(*n*) may be any now or hereafter known transparent and flexible electrodes that can be applied to a substrate (e.g., using adhesives, by coating, by printing, etc.), on either sides of a variable image and/an image layer as a whole, for providing electroconductive paths to the printed variable images (on same or different image layers) for application of suitable electric field stimuli. The individual electrophoretic particles will then align with the field and one of their optical sides turn upward, or the corresponding kind of particle within a microcapsule will move upward toward one electrode and/or the other kind of particle downward toward the other electrode so that a point with a desired color arises there. This permits different optical states of a variable image within a image layer to be evoked on the substrate. Examples of some such electrodes may include, without limitation, metal nanowires, grid, or mesh, carbon based electrodes (e.g., graphene electrodes, carbon nanotubes, etc.), transparent conductive films (TCFs) (e.g., transparent conductive oxides (TCOs) such as Indium Tin Oxide (ITO)), conductive polymers, or the like. In various embodiments, the electrodes 104(*a*)-(*n*) may be applied to each image layer in a manner that application of an electric field to the electrode causes the electrophoretic particles in the electrophoretic ink of one or more variable images of that image layer change from one optical state to the another. For example, in some embodiments, an electrode may be applied to cover substantially all of the variable image surface area in a image layer such that the display state of all the variable images in the image layer may be selectively controlled by application/removal of electric field to that image layer. Additionally and/or alternatively, an electrode may be applied such that an electric field zone of the electrode can cause the electrophoretic particles in the electrophoretic ink of the variable image change from one optical state to the another, without the electrode necessarily covering substantially all of the variable image surface area in a image layer. Optionally, the electrodes may be applied to the image layer so that an electric field can be locally and differentially applied at individual points of the image layer. For example, more than one electrode may be applied to an image layer at different positions to differentially control application of electric field at different positions of the same image layer. This permits the individual points of an image layer to be differentially addressed. For example, different variable images printed on the same image layer may be differentially controlled to change from one display state to another by application of suitable electric fields at different locations of the image layer.

Figure 2A:
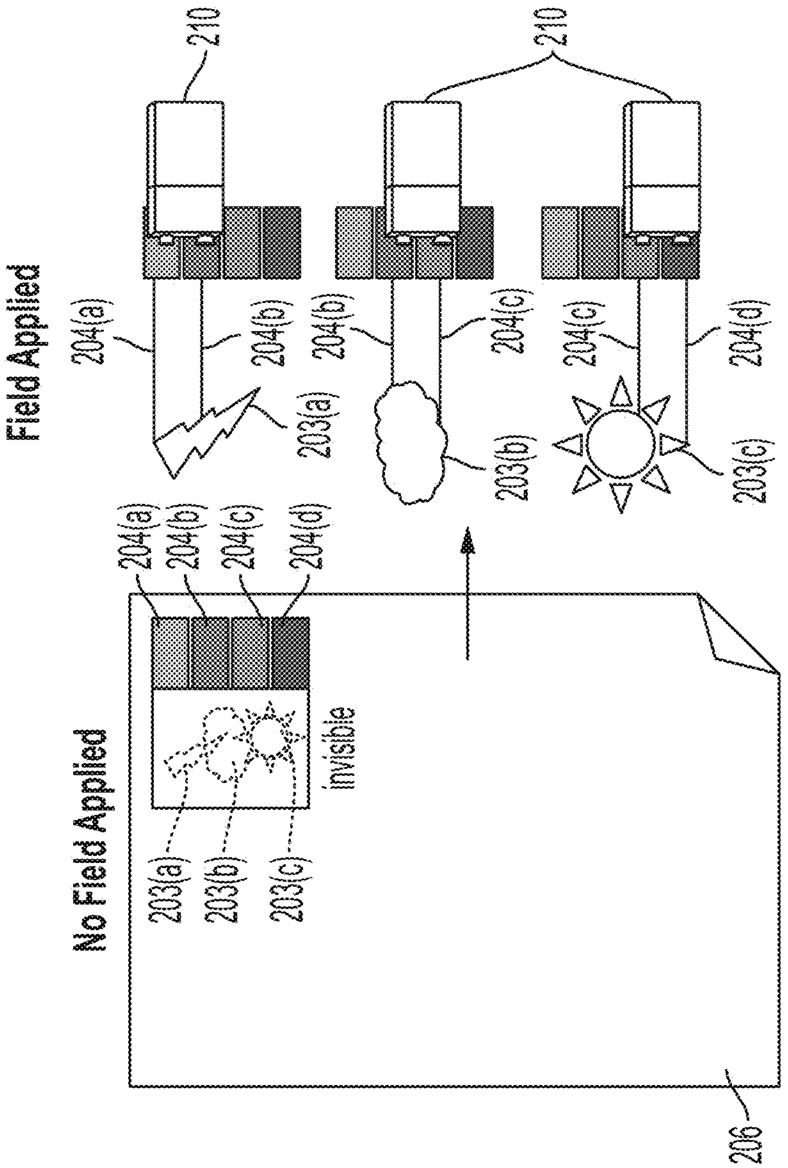
FIGS. 2A-2C illustrate schematic view of example printed substrates and selective control of variable elements.

The optical state of each of the image layers 102(*a*)-(*n*) can be controlled using application or non-application of electric field to the electrodes 104(*a*)-(*n*). For example, as shown in FIG. 2A, variable images 203(*a*), 203(*b*), and 203(*c*) are printed on the substrate 206 in separate overlapping first, second, and third image layers (not shown here but similar to layer 102(*a*)-(*n*) of FIG. 1), where each image layer is sandwiched between electrodes 204(*a*)-(*b*), 204(*b*)-(*c*), and 204(*c*)-(*d*), respectively. The variable images 203(*a*), 203(*b*), and 203(*c*) are printed using black and white electrophoretic ink (i.e., ink comprising electrophoretic particles that appear white on side and black on the other). As shown, before application of an electric field that causes the electrophoretic particles to appear black, each of the variable images 203(*a*), 203(*b*), and 203(*c*) is invisible. For example, an electric field may be applied to the images immediately after printing that causes the electrophoretic particles to appear white (i.e., to match the color of the substrate) and/or the electrophoretic particles may be invisible when the differently charged and colored particles of each electrophoretic microcapsule are randomly suspended in clear fluid. However, variable image 203(*a*) becomes visible when electric field is applied (e.g., using a battery 210) to electrodes 204(*a*)-(*b*) across the first image layer to cause the electrophoretic particles to appear black, variable image 202(*b*) becomes visible when electric field is applied using electrodes 204(*b*)-(*c*) across the second image layer to cause the electrophoretic particles to appear black, and variable image 202(*c*) becomes visible when electric field is applied using electrodes 204(*c*)-(*d*) across the third image layer to cause the electrophoretic particles to appear black.

Figure 2B:
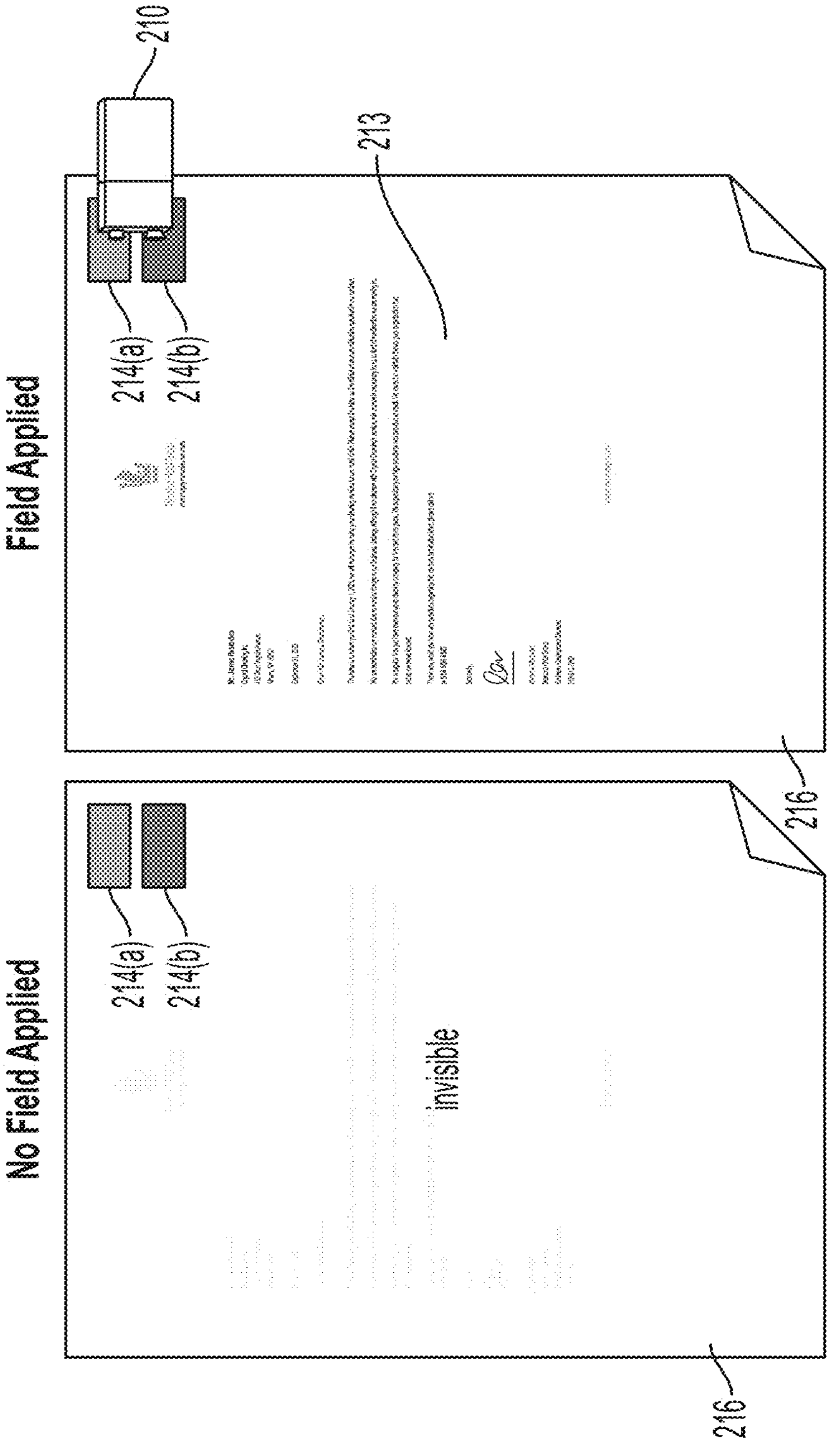
Figure 2C:
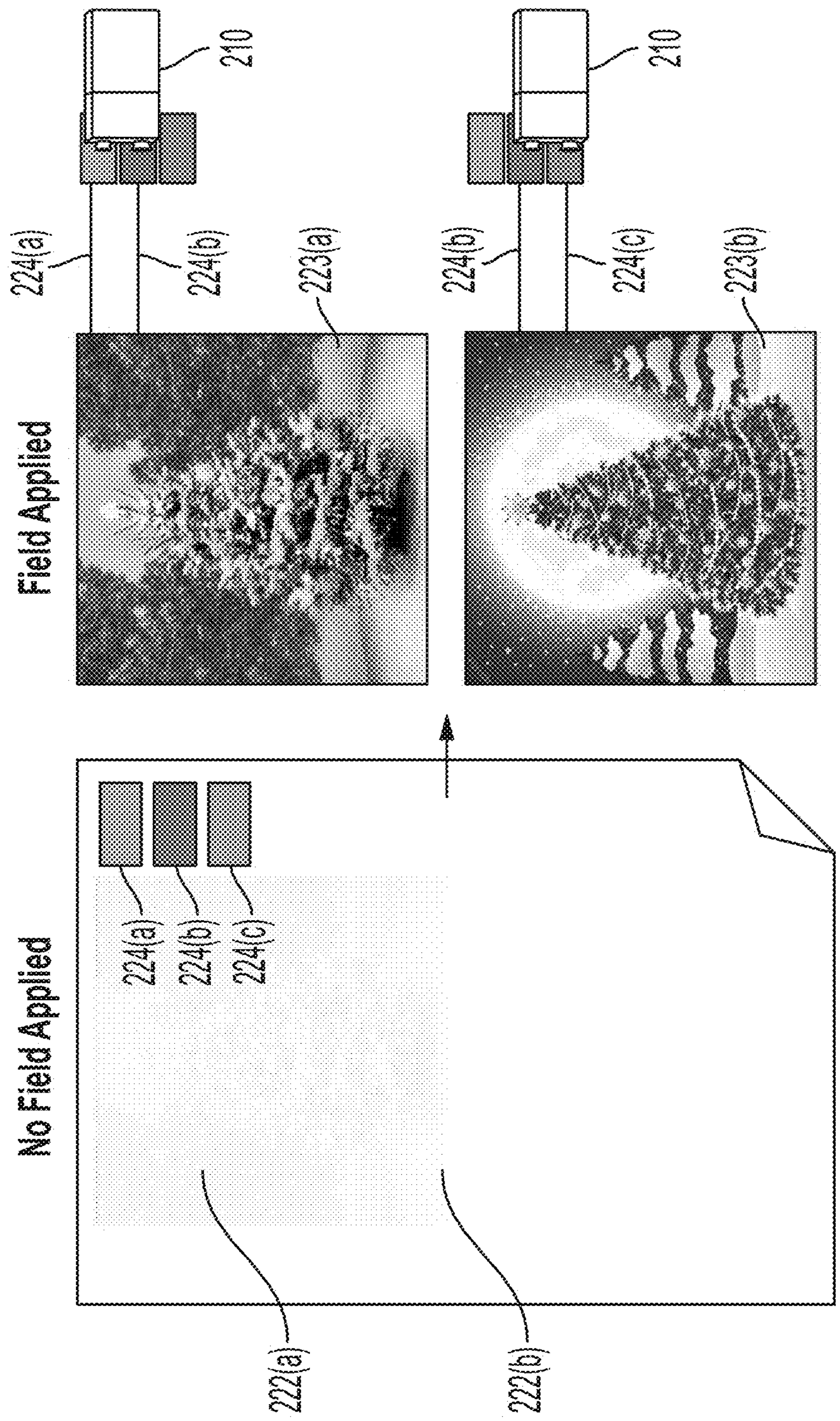

FIG. 2B illustrates another example in which a single image layer (not shown here) is printed and sandwiched between electrodes 214(*a*)-(*b*). As shown, in the absence of electric field, the variable image 213 is invisible. However, variable image 213 becomes visible when electric field is applied using electrodes 214(*a*)-(*b*). FIG. 2C illustrates another example in which two image layers 222(*a*) and 222(*b*) are printed to include variable images 223(*a*) and 223(*b*), and sandwiched between electrodes 224(*a*)-(*b*) and 224(*c*)-(*d*), respectively. In a process of making the document, after each ink layer is printed, an electrode is positioned on top of that ink layer. The variable images are printed using different electrophoretic inks that have charged particles with differing color (CMYK) combinations such that image layer 223(*a*) becomes visible in a first color combination upon application of electric field across 224(*a*)-(*b*) across image layer 222(*a*), while variable image 223(*b*) becomes visible in a second color combination upon application of electric field across 224(*b*)-(*c*) across image layer 222(*b*). The variable images 223(*a*) and 223(*b*) may be the same image shown in different colors, same image shown in different positions with respect to the substrate, different images altogether, or the like.

In various embodiments, the present disclosure can include a first set of image layers printed on one side of a substrate and another set of image layers printed on another side of the substrate. Optionally, variable images in the same image layer may be differentially activated or transitioned to different states by appropriate application of the electric field.

Referring back to FIG. 1, while not shown here, one or more protective coatings or layers may be applied and/or printed over each image layer, each electrode layer, and/or over the top image layer. For example, a protective coating may be applied to protect the printed images from ultraviolet light degradation, protection from scratching, or the like.

While also not shown here, the printed structure 100 may also include static images that are unchangeable and always visible printed on one or more of the image layers discussed below, while the variable images change depending upon the electric field (or other stimulus) being applied.

Embodiments of the disclosure may be utilized for applying security marks such as a signature or other authenticating markings. For example, an original document may include a variable image as a security mark. The variable image may be invisible until an appropriate electric field is applied. When the electric field is applied, the security mark (i.e., the variable image) may be viewed and authenticated. The variable image may be placed or designed in such a manner that only authorized users may know that the variable image has been applied, or where the variable image has been applied (for identification of the electrodes through which electric field need to be applied), and/or where the electrodes are applied for application of the electric field. Authentication of the document may then be restricted to only those with knowledge of the security mark and how to activate it.

Figure 3:
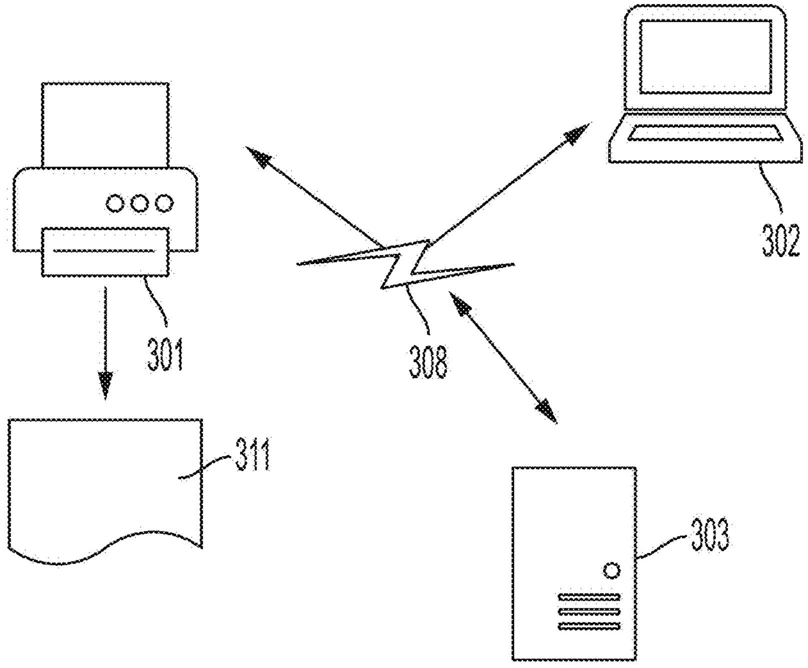
FIG. 3 illustrates the basic elements of a system that may be used to for creating the printed substrate of FIG. 1.

FIG. 3 illustrates the basic elements of a system that may be used to for creating a printed substrate that includes selectively controllable variable elements, such as that described above. The system includes a print device 301 that includes supply chambers for ink or toner and a print head that can apply the ink or toner to a substrate to create a marking. At least some of the supply chambers may be configured to store electrophoretic ink or toner, and the print head may be configured to apply electrophoretic ink or toner.

The print device 301 may include a processor and memory with programming instructions that cause the printer to receive data from an external source and process the data perform various print-related functions. In addition or alternatively, the print device 301 may be in wired or wireless electronic communication with one or more computing devices 302 that include a processor and computer-readable medium with an installed print driver that provides instructions, data or both to the printer. In addition or alternatively, the print device 301 and/or printer may be in wired or wireless electronic communication with one or more remote servers 303 that include a processor and computer-readable medium that is configured to send instructions, data or both to the printer or the computing device. The computing device 302 may be integrated within the print device 301, or the devices may be separate devices that are able to transfer messages and communicate with each other via a direct communication link (such one using Bluetooth or another near-field or short-range communication protocol) or via an indirect link through one or more other devices and/or communication networks 308 such as a Wi-Fi network, local area network, cellular communication network and/or the Internet.

In operation, the printer 301 will print a document 311 (e.g., printed structure 100) that contains variable image elements that can change from one display state to another upon application of a suitable stimulus (e.g., electric field), and selectively controlled in accordance with this disclosure.

Figure 4:
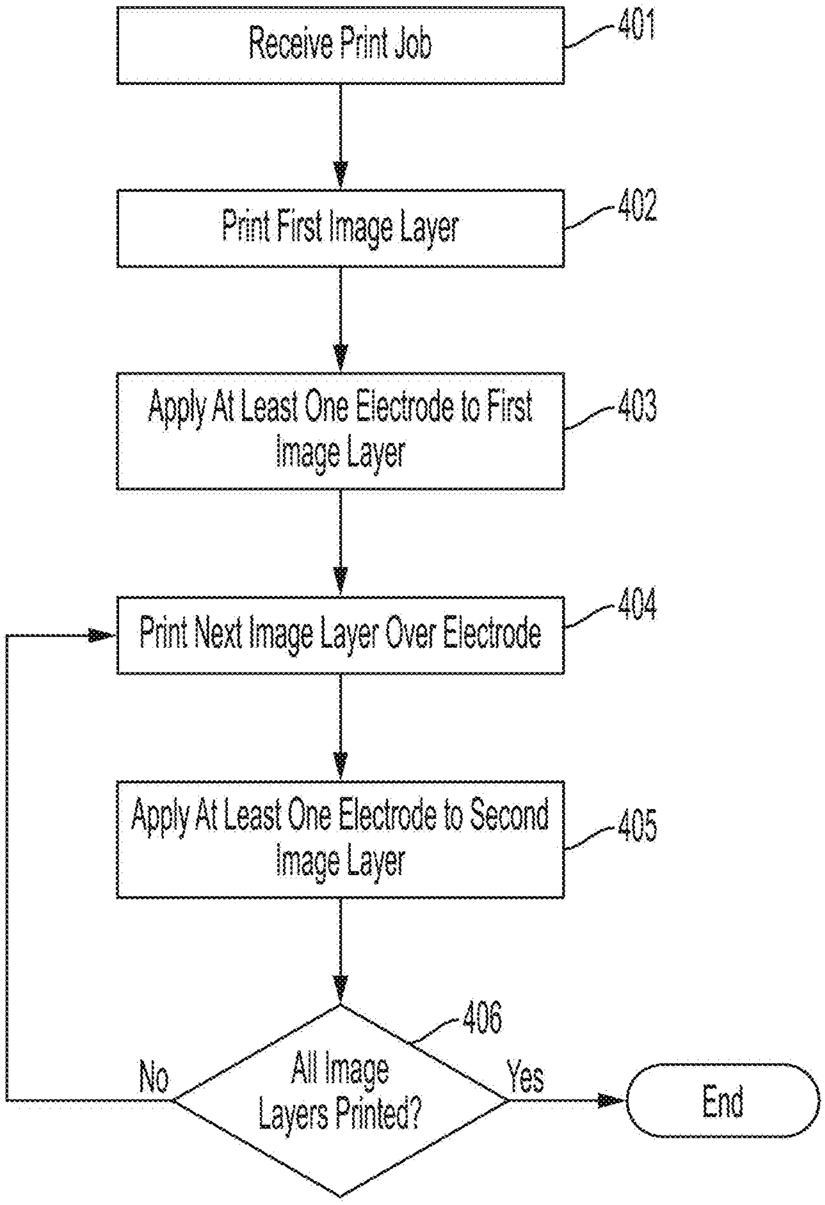
FIG. 4 is a flow diagram illustrating an example process for creating a printed substrate that includes selectively controllable variable image elements.

FIG. 4 is a flow diagram illustrating an example process for creating a printed substrate that includes selectively controllable variable image elements.

In an embodiment, the system may receive 401 a print job for generating a printed substrate including one or more variable images. In one embodiment, the print job may be received from an external source, such as by email, file transfer or another communications protocol. Alternatively, the electronic device may receive the print job by generating it based on user input through a document generation application such as a word processor, publisher, web browser or other document generation application.

The print job may include information relating to each of a plurality of image layers to be printed on the substrate such as without limitation, information relating to one or more variable images in each image layer, information relating to one or more static images in each image layer, positioning of the image layers with respect to each other, positioning of one or more electrode pairs with respect to each image layer, information relating to a display effect being created, or the like. Information relating to a variable image may include, for example, type of electrophoretic ink to be used for printing the variable image (e.g., black and white, color, or the like), information regarding electric field(s) for changing the optical state of the variable image, position of the variable image on an image layer with respect to the substrate, or the like. In some embodiments, the system may automatically determine at least some of the information above based on a rule set(s) relating to, for example, creation of one or more display effects, user instructions, intended use of the printed substrate, or the like. For example, if the display effect to be created is to change the color of a variable image from a first color to a second color, the system may determine (based on a corresponding rule set) that two image layers need to be printed, each image layer sandwiched between at least one pair of electrodes and including the same image printed using different electrophoretic inks (with appropriately colored electrophoretic particles) at the same position with respect to the substrate. In such an example, the image appears in a first color upon application of electric field to the electrodes of a first image layer, and in a second color upon application of electric field to the electrodes of the second image layer (while the first image layer to selectively made invisible, as discussed above). In another example, if the intended use of the printed substrate is to include a variable image watermark for authentication or security, the system may determine that at least one image layer including the variable image watermark will be printed sandwiched between at least one pair of electrodes, such that the watermark only becomes visible upon application of electric field to the corresponding electrodes. In such an example, other information may be printed using non-electrophoretic ink and/or electrophoretic ink. Other effects (e.g., movement of an image across the substrate, a blinking effect, etc.) may similarly be created.

Next, the process may include printing a first image layer including at least some of the variable images of the print job (402). For example, a first image layer may be deposited, such as using an inkjet printing method, onto the substrate. Optionally, the first image layer may be printed over an electrode applied to the substrate (discussed below). The first image layer may include at least one portion that comprises a variable image printed using electrophoretic ink. The process may then include application of a pair of electrodes may be applied on either sides of the the first image layer (403). In various embodiments, an electrode may be applied via printing. For example, ITO may be formulated into toner and/or ink and used in a printing system for printing of the transparent electrodes on the substrate. For example, a first electrode may be applied to the substrate before printing of the first image layer, the first image layer may be printed over the first electrode, and a second electrode may be applied on top of the first image layer after printing of the first image layer. In some implementations, when a single image layer is to be printed, the electrodes are printed first and last in a print engine in one pass with the image(s) of the image layer printed between the printing of the two electrodes. In some implementations, when multiple image layers are to be printed, the first image layer is printed sandwiched between two electrodes as described above, and the substrate is brought back to the printing station for the second image layer, and the process repeats for the third and fourth, etc. (multi-pass mode). Alternatively and/or additionally, a first electrode may be applied to a first side of the substrate, the first image layer may be printed on a second side of the substrate, and a second electrode may be applied on top of the first image layer.

The process may then include printing one or more other image layers (e.g., a second image layer) over the first image layer and electrode pair combination (404). For example, a second image layer may be deposited, such as using an inkjet printing method, onto the first image layer. In some implementations, a first portion of the second image layer may be deposited onto the first image layer and a second portion of the second image layer may be deposited onto the substrate. The second image layer may include at least one portion that comprises a variable image printed using electrophoretic ink. The process may then include application of an electrode on at least one side of the second image layer (405). Optionally, a pair of electrodes may be applied on either sides of the second image layer. Additionally and/or alternatively, at least one electrode of step 403 and electrode of step 405 may sandwich the second image layer.

Steps 404-405 may be repeated until all the image layers have been printed (406).

The process may, optionally, include application of an appropriate initial stimulus (e.g., electric field), via the electrodes, to fix an orientation of the particles of the electrophoretic ink in the first image layer and/or the other image layers such that the variable images are configured to be in a first display state (e.g., visible, invisible, colored, black and white, etc.). For example, the first image layer and/or the other image layers may be exposed to an electric field to cause the variable image(s) in each such layer to be in a desired first display state by fixing the orientation to be in a first static position. As discussed above, upon application of a second stimulus at a later time, the variable images in the first image layer and/or the other image layers may change to a second display state. Such an initial stimulus may not be required in, for example, embodiments where the electrophoretic particles are suspended in a clear fluid in random orientations such that the electrophoretic ink of a variable image appears invisible, the invisible state being the first display state.

In some embodiments, a protective layer may additionally be applied on one or more of the image layers (for e.g., over the top image layer or any of the other image layers).

Figure 5:
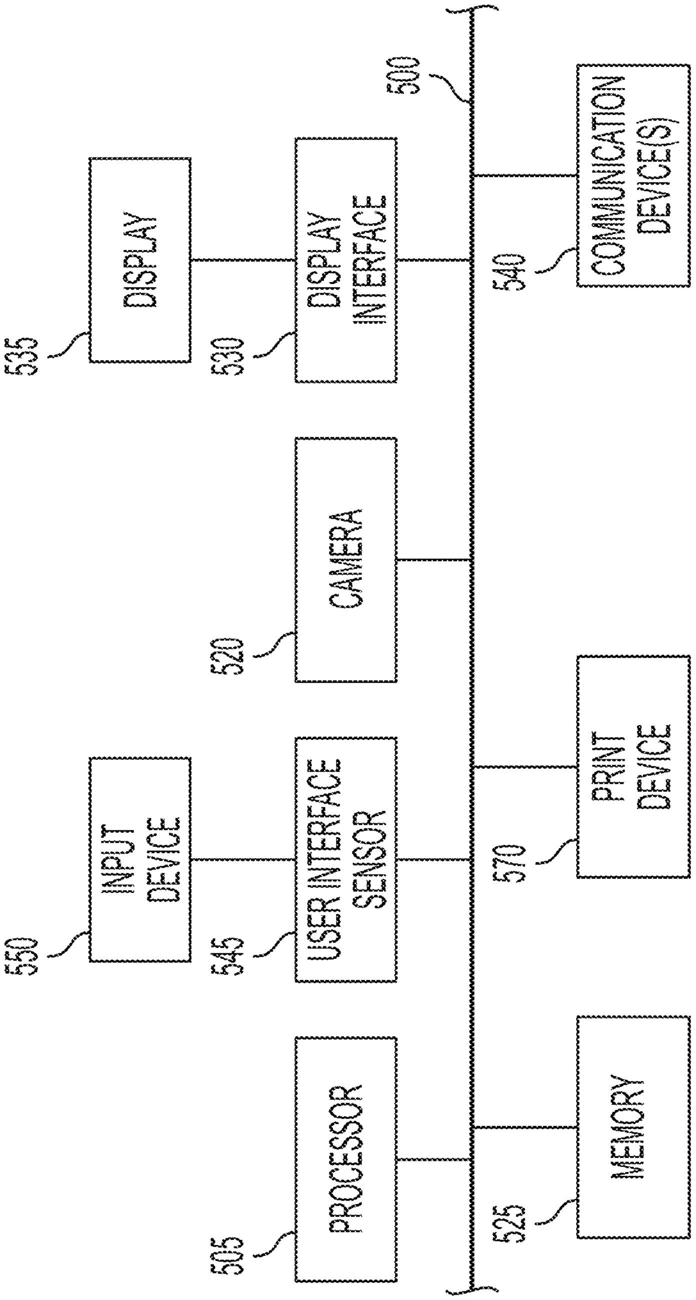
FIG. 5 illustrates example components of computing devices that may implement various embodiments described in this document.

FIG. 5 depicts an example of internal hardware that may be included in any of the electronic components of the system, such as in the print device, in a computing device, etc. One or more conductive busses 500 serve as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication systems. The communication device 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Digital image frames also may be received from an imaging device 520, such as a camera or scanner, that can capture video and/or still images. The system also may include a print device 570.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the terms "printer" and "print device" refer to a machine having hardware capable of reading a digital document file and using the information from the file and associated print instructions to print a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multi-function device. A print device also may include a processor and a memory device containing programming instructions and/or stored data. In embodiments that print a 3D object, the print device may be a 3D printer that can use a digital model to successively place layers of build material on a substrate in a configuration that results in a 3D object.

In this document, the term "print job" refers to any set of instructions that when executed, or a process that when performed, will cause a print device to print digital content from one or more digital content files onto a substrate.

The term "document" refers to a substrate onto which content has been printed. The content may be printed on the substrate using toner and/or ink. The document may, for example, include one or more areas comprising characters, and/or one or more other areas comprising images.

When this document uses the term "secure document," it refers to a printed document that includes a printed security element such as a variable image.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A printed structure comprising:

a substrate;

a first printed image layer, the first printed image layer comprising a first variable image printed using a first electrophoretic ink;

a first electroconductive path to the first variable image, wherein the first variable image is configured to change from a first display state to a second display state upon application of an electric field via the first electroconductive path;

a second printed image layer printed at least partially over the first printed image layer, the second printed image layer comprising a second variable image printed using a second electrophoretic ink; and at second electroconductive path to the second variable image, wherein the second variable image is configured to change from a third display state to a fourth display state upon application of the electric field via the second electroconductive path.

2. The printed structure of claim 1, wherein the substrate is made from a flexible material comprising at least one of the following: paper, acrylic, polyester, vinyl, or cloth.

3. The printed structure of claim 1, wherein each of the first electrophoretic ink and the second electrophoretic ink comprises a plurality of microcapsules, each of the plurality of microcapsules including a plurality of electrophoretic particles that will change an optical property of that electrophoretic ink upon application of the electric field to cause the first variable image to change from the first display state to the second display state or cause the second variable image to change from the third display state to the fourth display state.

4. The printed structure of claim 3, wherein at least some of the plurality of electrophoretic particles include a first side that includes black pigment and a first charge and a second side that includes white pigment and a second charge.

5. The printed structure of claim 3, wherein at least some of the plurality of electrophoretic particles include a first side that includes a first color pigment and a first charge, and a second side that includes a second color pigment and a second charge.

6. The printed structure of claim 1, further comprising a protective layer formed over at least one of the first printed image layer or the second printed image layer.

7. The printed structure of claim 1, wherein the first variable image is invisible in the first display state and the second variable image exhibits a second color in the fourth display state such that application of the electric field via the second electroconductive path without application of the electric field via the first electroconductive path causes the printed substrate to display the second variable image in the second color.

8. The printed structure of claim 1, wherein the first variable image exhibits a first color in the second display state and the second variable image is invisible in the third display state such that application of the electric field via the first electroconductive path without application of the electric field via the second electroconductive path causes the printed substrate to display the first variable image in the first color.

9. The printed structure of claim 1, further comprising a static image that does not change display state.

10. The printed structure of claim 1, wherein each of the first electroconductive path and the second electroconductive path comprises a pair of transparent electrodes.

11. The printed structure of claim 1, wherein the first printed image layer is sandwiched between a pair of transparent electrodes.

12. A method for creating a printed structure comprising selectively controllable variable images, the method comprising:

printing, by a print device, a first image layer on a substrate, the first printed image layer comprising a first variable image printed using a first electrophoretic ink;

providing a first electroconductive path to the first variable image, wherein the first variable image is configured to change from a first display state to a second display state upon application of an electric field via the first electroconductive path;

printing at least partially over the first printed image layer, by the print device, a second printed image layer comprising a second variable image printed using a second electrophoretic ink; and providing a second electroconductive path to the second printed image layer, wherein the second variable image is configured to change from a third display state to a fourth display state upon application of the electric field via the second electroconductive path.

13. The method of claim 12, wherein the substrate is made from a flexible material comprising at least one of the following: paper, acrylic, polyester, vinyl, or cloth.

14. The method of claim 12, wherein the printing of the first image layer and the second image layer comprises inkjet printing or xerographic printing.

15. The method of claim 12, further comprising applying a protective layer over at least one of the first image layer or the second image layer.

16. The method of claim 12, wherein providing the first electroconductive path comprises printing, by the print device, a pair of electrodes that sandwich the first image layer.

17. The method of claim 16, wherein providing the second electroconductive path comprises printing, by the print device, a pair of electrodes that sandwich the second image layer.

18. A system for creating a printed structure comprising selectively controllable variable images, the system comprising:

a print device;

a processor; and a non-transitory computer readable medium comprising programming instructions that when executed by the processor will cause the processor to:

cause the print device to print a first image layer on a substrate, the first printed image layer comprising a first variable image printed using a first electrophoretic ink, provide a first electroconductive path to the first variable image, wherein the first variable image is configured to change from a first display state to a second display state upon application of an electric field via the first electroconductive path, cause the print device to print at least partially over the first printed image layer, by the print device, a second printed image layer comprising a second variable image printed using a second electrophoretic ink, and provide a second electroconductive path to the second printed image layer, wherein the second variable image is configured to change from a third display state to a fourth display state upon application of the electric field via the second electroconductive path.

19. The system of claim 18, wherein the substrate is made from a flexible material comprising at least one of the following: paper, acrylic, polyester, vinyl, or cloth.

20. The system of claim 18, wherein the printing of the first image layer and the second image layer comprises inkjet printing or xerographic printing.

* * * * *